(12) United States Patent
Cherian et al.

(10) Patent No.: US 7,958,302 B2
(45) Date of Patent: Jun. 7, 2011

(54) SYSTEM AND METHOD FOR COMMUNICATING DATA IN A STORAGE NETWORK

(75) Inventors: Jacob Cherian, Austin, TX (US); Gaurav Chawla, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 874 days.

(21) Appl. No.: 11/929,239

(22) Filed: Oct. 30, 2007

(65) Prior Publication Data

US 2009/0112877 A1    Apr. 30, 2009

(51) Int. Cl.
*G06F 12/00* (2006.01)

(52) U.S. Cl. .................................. 711/114; 711/147

(58) Field of Classification Search .................. None
See application file for complete search history.

(56) References Cited

U.S. PATENT DOCUMENTS

| | | | |
|---|---|---|---|
| 6,895,461 B1 | 5/2005 | Thompson | 710/305 |
| 6,915,354 B1 | 7/2005 | Ozdemir et al. | 710/5 |
| 7,133,363 B2 | 11/2006 | Takase et al. | 370/230 |
| 7,185,030 B2 | 2/2007 | Kodama | 707/203 |
| 7,260,631 B1 | 8/2007 | Johnson et al. | 709/224 |

*Primary Examiner* — Shawn X Gu
(74) *Attorney, Agent, or Firm* — Baker Botts L.L.P.

(57) ABSTRACT

Systems and methods for communicating data in a storage network are disclosed. A method may include communicating, from a host to a storage array, a request for data having different portions stored in different storage nodes of the storage array. In response to the request, a first storage node of the storage array may communicate to the host a first portion of the requested data stored on the first storage node. The first storage node may communicate a message to the host indicating that a second portion of the requested data is stored on a second storage node of the storage array. The host may communicate a message to the second storage node indicating that the host is ready to receive the second portion of the requested data. The second storage node may communicate to the host a second portion of the requested data stored on the second storage node.

20 Claims, 11 Drawing Sheets

SYSTEM AND METHOD FOR COMMUNICATING DATA IN A STORAGE NETWORK

TECHNICAL FIELD

The present disclosure relates in general to data storage, and more particularly to a system and method for communicating data in a storage network.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of storage resources, such as a Redundant Array of Independent Disks (RAID), for example, for storing information. Arrays of storage resources typically utilize multiple disks to perform input and output operations and can be structured to provide redundancy which may increase fault tolerance. Other advantages of arrays of storage resources may be increased data integrity, throughput and/or capacity. In operation, one or more storage resources disposed in an array of storage resources may appear to an operating system as a single logical storage unit or "logical unit." Implementations of storage resource arrays can range from a few storage resources disposed in a server chassis, to hundreds of storage resources disposed in one or more separate storage enclosures.

Often, instead of using larger, monolithic storage systems, architectures allowing for the aggregation of smaller, modular storage systems to form a single storage entity, "a scaled storage array" (or storage array), are used. Such architectures may allow a user to start with a storage array of one or few storage systems and grow the array in capacity and performance over time based on need by adding additional storage systems. The storage systems that are part of a scaled storage array (or storage array) may be referred to as the storage nodes of the array. However, conventional approaches employing this architecture possess inefficiencies and do not scale well when numerous storage resources are included. For example, if a "READ" or "DATA IN" request is communicated to a storage array comprising multiple storage nodes, one of the storage nodes may receive and respond to the request. However, if all of the requested data is not present on the storage node, it may need to request the remaining data from the other storage nodes in the storage array. Often, such remaining data must be communicated over a data network to the original storage node receiving the READ request, then communicated again by the original storage node to the information handling system issuing the READ request. Thus, some data may be required to be communicated twice over a network. Accordingly, such conventional approach may lead to network congestion and latency of the READ operation. Also, because such congestion and latency generally increases significantly as the number of storage nodes in the storage array increases, the conventional approach may not scale well for storage arrays with numerous storage nodes.

An illustration of disadvantages of conventional approaches is depicted in FIGS. 1A and 1B. FIGS. 1A and 1B each illustrate a flow chart of a conventional method 100 for reading data from a plurality of storage nodes disposed in a storage array. In particular, as shown in FIGS. 1A and 1B, a host device may issue a command to read data from a storage array, wherein a portion of the data is stored in a first storage node, another portion of the data is stored in a second storage node, and yet another portion of the data is stored in a third storage node.

As depicted in FIGS. 1A and 1B, the first storage node which receives the request for data, provides a portion of the data stored locally on the storage node. The first storage node then issues its own request to one or more other storage nodes which contain a remainder of the requested data. The other storage nodes transfer the data to the original storage node, which then transfers the data back to the host, to complete transfer of all data requested in the read operation.

For example, at step 102 of FIG. 1A, a host device may issue a READ command to the first storage node. At step 104, the first storage node may communicate to the host device the portion of the data residing on the first storage node. At step 106, the first storage node may issue its own READ command to a second storage node. In response, at step 108, the second storage node may communicate to the first storage node the portion of the data residing on the second storage node, after which, at step 110, the second storage node may communicate to the first storage node a STATUS message to indicate completion of the data transfer from the second storage node. At step 112, the first storage node may communicate to the host device the portion of the data that was stored on the second storage node.

Similarly, at step 114, the first storage node may issue a READ command to a third storage node. At step 116, the third storage node may communicate to the first storage node the portion of data residing on the third storage node, and then communicate to the first storage node a STATUS message to indicate the completion of the data transfer at step 118. At step 120, the first storage node may communicate to the host device the portion of the data that was stored on the third storage node. At step 122, the first storage node may communicate to the host device a status message to indicate completion of the transfer of the requested data. After completion of step 122, method 100 may end.

While method 100 depicted in FIGS. 1A and 1B may successfully communicate data from a storage array to a host device, method 100 may suffer from numerous drawbacks. For example, because data read from each of the second and third storage nodes must be communicated over a network twice (e.g., for the portion of the data stored on the second storage node: once from the second storage node to the first storage node as depicted in step 108, then from the first storage node to the host device at step 112), the method 100 may lead to network congestion and latency of the READ operation. Also, because such congestion and latency increases significantly as the size of a storage array increases, the conventional approach may not scale well for storage arrays with numerous storage nodes.

SUMMARY

In accordance with the teachings of the present disclosure, disadvantages and problems associated with data input/output operations in a scaled storage system have been substantially reduced or eliminated. In a particular embodiment, a method may include communicating, from each of a plurality of storage nodes disposed in a storage array to a host device, portions of data to be stored to the storage array.

In accordance with one embodiment of the present disclosure, a method for communicating data is provided. The method may include communicating, from a host device to a storage array having a plurality of storage nodes, a request for data having different portions stored in multiple different storage nodes of the storage array. In response to the request a first storage node of the storage array may communicate to the host device a first portion of the requested data stored on the first storage node. In addition, the first storage node may communicate a message to the host device indicating that a second portion of the requested data is stored on a second storage node of the storage array. Furthermore, the host device may communicate a message to the second storage node indicating that the host device is ready to receive the second portion of the requested data. Also, the second storage node may communicate to the host device a second portion of the requested data stored on the second storage node.

In accordance with another embodiment of the present disclosure, a method for communicating data is provided. The method may include communicating a request from a host device to a storage array having a plurality of storage nodes to store data in a storage array. The host device may also communicate a first portion of the data to be stored to a first storage node disposed in the storage array. In addition, the first storage node may communicate a message to the host device indicating that a second portion of the data should be stored on a second storage node disposed in the storage array. Further, the host device may communicate a second portion of the data to be stored to the second storage node.

In accordance with a further embodiment of the present disclosure, a system for communicating data may include a host device and a storage array. The storage array may have a first storage node and a second storage node, each of the first storage node and the second storage node communicatively coupled to the host device and to each other. The host device may be operable to: (a) communicate a request to the storage array for data stored in the storage array; (b) receive from the first storage node a first portion of the requested data stored on the first storage node; (c) receive a message from the first storage node indicating that a second portion of the data is stored on a second storage node disposed in the storage array; (d) communicate a message to the second storage node indicating that the host device is ready to receive the second portion of the data; and (e) receive from the second storage node a second portion of the requested data stored on the second storage node.

In accordance with yet another embodiment of the present disclosure, a system for communicating data may include a host device and a storage array. The storage array may have a first storage node and a second storage node, each of the first storage node and the second storage node communicatively coupled to the host device and to each other. The host device may be operable to (a) communicate a request to the storage array to store data in the storage array; (b) communicate to the first storage node a first portion of the data to be stored; (c) receive a message from the first storage node a message indicating that a second portion of the data should be stored on a second storage node disposed in the storage array; and (d) communicate to the second storage node a second portion of the data to be stored.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6B, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

As discussed above, an information handling system may include or may be coupled via a network to an array of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, and/or others.

Figure 1A:
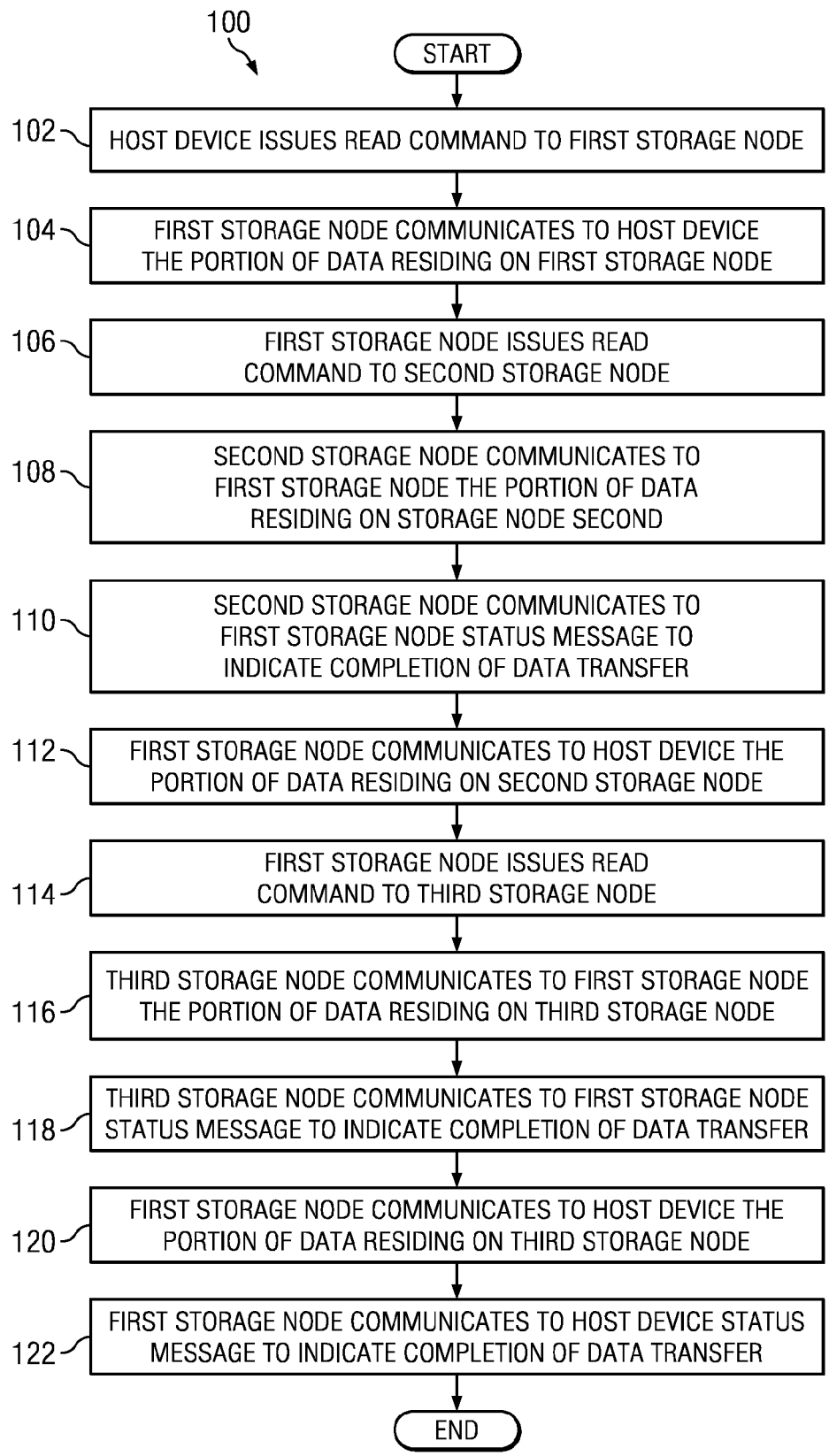
FIGS. 1A and 1B each illustrate a flow chart of a conventional method for reading data from a storage array.
Figure 1B:
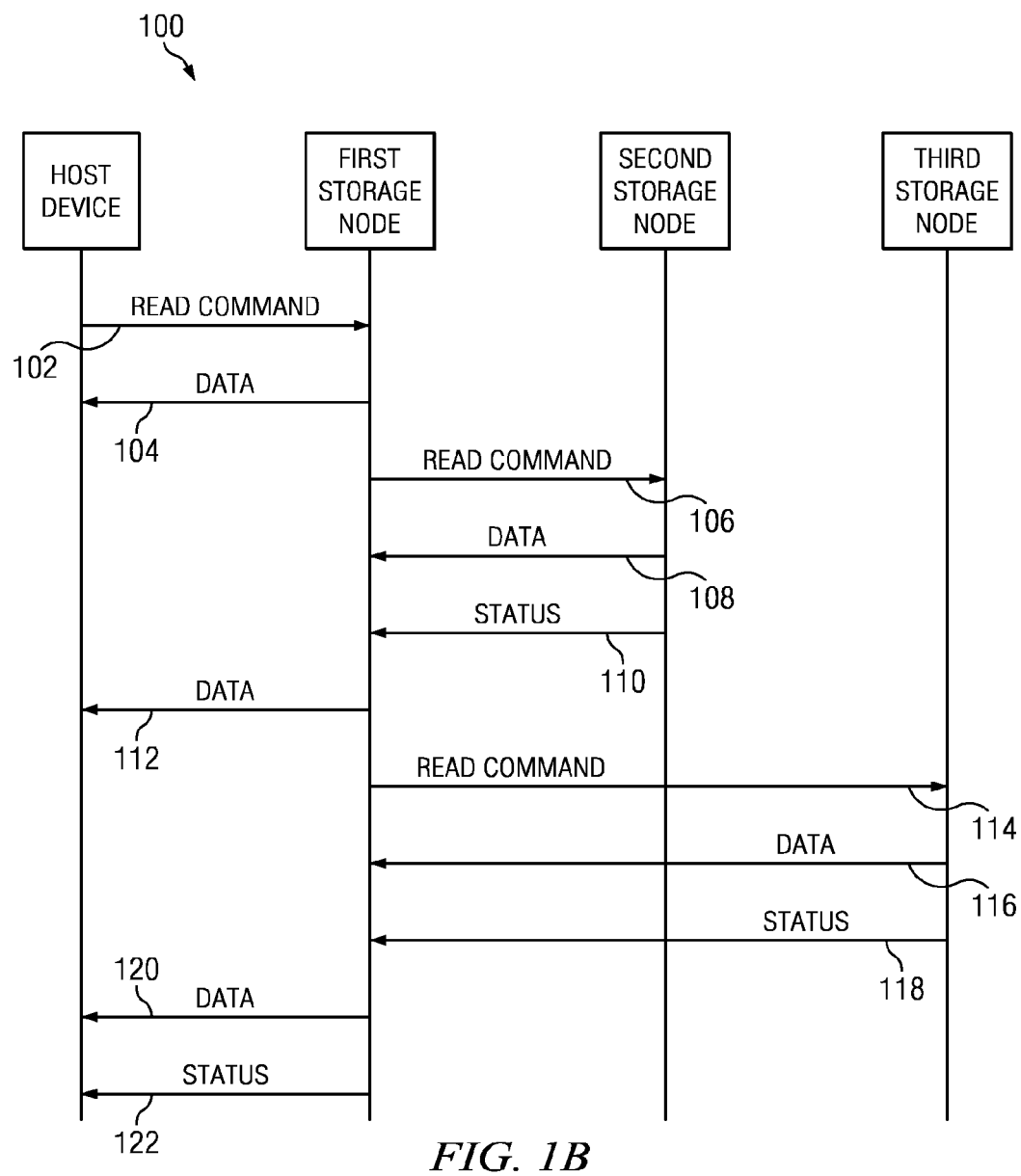
Figure 2:
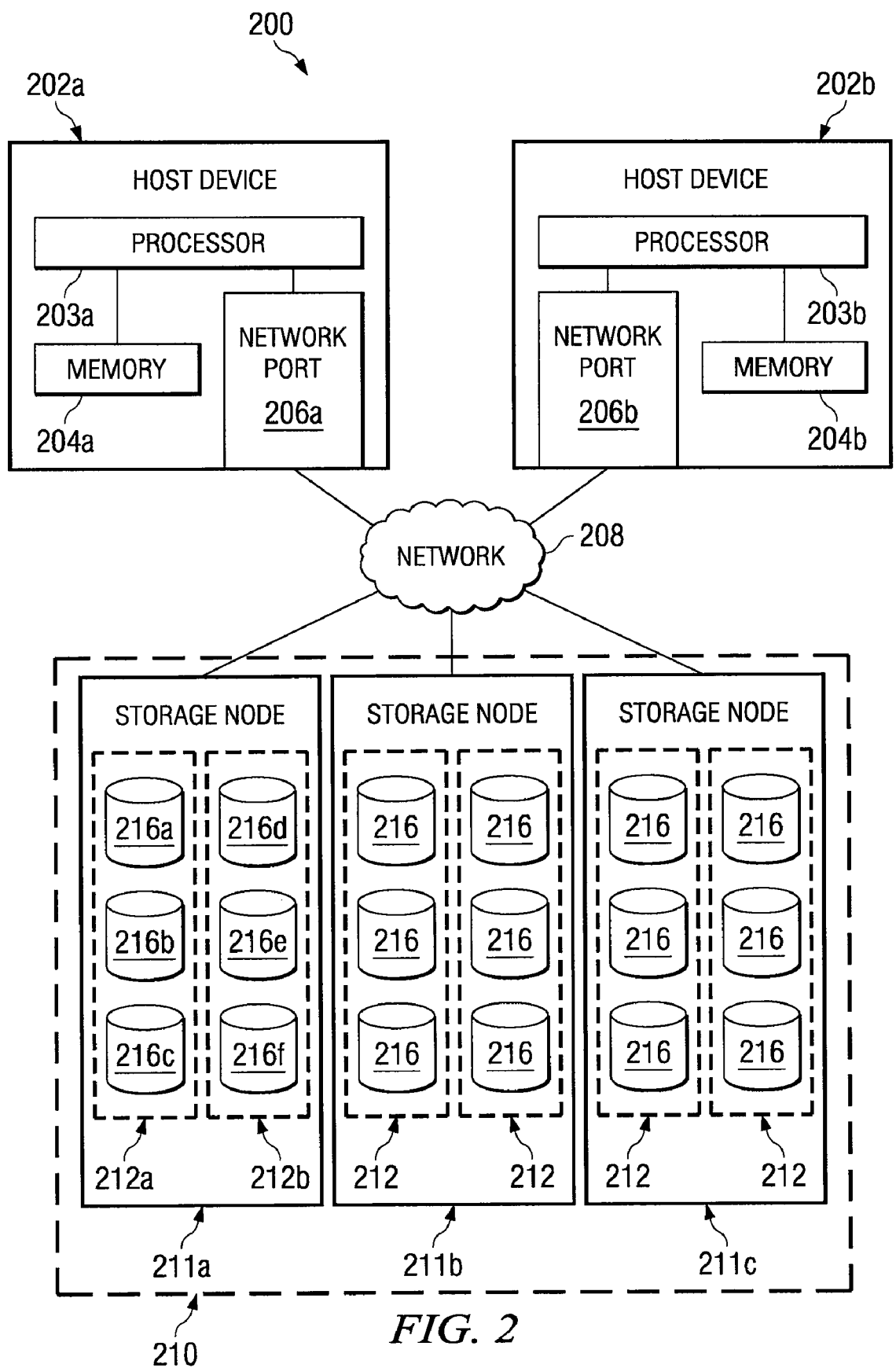
FIG. 2 illustrates a block diagram of an example system for reading data from and writing data to a storage array, in accordance with the present disclosure.

FIG. 2 illustrates a block diagram of an example system 200 for reading data from and writing data to a storage array, in accordance with the present disclosure. As depicted in FIG. 2, system 200 may comprise one or more host devices 202, a network 208, and a storage array 210.

Each host device 202 may comprise an information handling system and may generally be operable to read data from and/or write data to one or more logical units 216 disposed in storage array 210. In certain embodiments, one or more of host devices 202 may be a server. As depicted in FIG. 2, each host device may comprise a processor 203, a memory 204 communicatively coupled to processor 203, and a network port 206 communicatively coupled to processor 203.

Each processor 203 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 203 and/or another component of host device 202.

Each memory 204 may be communicatively coupled to its associated processor 203 and may comprise any system, device, or apparatus operable to retain program instructions or data for a period of time. Memory 204 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to host device 202 is turned off.

Network port 206 may be any suitable system, apparatus, or device operable to serve as an interface between host device 202 and network 208. Network port 206 may enable host device 202 to communicate over network 208 using any suitable transmission protocol and/or standard, including without limitation all transmission protocols and/or standards enumerated below with respect to the discussion of network 208.

Although system 200 is depicted as having two hosts 202, system 200 may include any number of hosts 202.

Network 208 may be a network and/or fabric configured to couple host devices 202 to storage array 210. In certain embodiments, network 208 may allow hosts 202 to connect to logical units 212 disposed in storage array 210 such that the logical units 212 appear to hosts 202 as locally attached storage resources. In the same or alternative embodiments, network 208 may include a communication infrastructure, which provides physical connections, and a management layer, which organizes the physical connections, logical units 212 of storage array 210, and hosts 202. In the same or alternative embodiments, network 208 may allow block I/O services and/or file access services to logical units 212 disposed in storage array 210. Network 208 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 208 may transmit data using any communication protocol, including without limitation, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Further, network 208 may transport data using any storage protocol, including without limitation, Fiber Channel, Internet SCSI (iSCSI), Serial Attached SCSI (SAS), or any other storage transport compatible with SCSI protocol. Network 208 and its various components may be implemented using hardware, software, or any combination thereof.

As depicted in FIG. 2, storage array 210 may comprise one or more storage nodes 211, and may be communicatively coupled to host devices 202 and/or network 208, in order to facilitate communication of data between host devices 202 and storage nodes 211. As depicted in FIG. 2, each storage node 211 may comprise one or more physical storage resources 216, and may be communicatively coupled to hosts 202 and/or network 208, in order to facilitate communication of data between hosts 202 and physical storage resources 216. Physical storage resources 216 may include hard disk drives, magnetic tape libraries, optical disk drives, magneto-optical disk drives, compact disk drives, compact disk arrays, disk array controllers, and/or any other system, apparatus, or device operable to store data.

In operation, one or more physical storage resources 216 may appear to an operating system executing on host 202 as a single logical storage unit or virtual resource 212. For example, as depicted in FIG. 2, virtual resource 212a may comprise storage resources 216a, 216b and 216c. Thus, host 202 may "see" virtual resource 212a instead of seeing each individual storage resource 216a, 216b, and 216c. Although in the embodiment depicted in FIG. 2 each virtual resource 212 is shown as including three physical storage resources 216, a virtual resource 212 may comprise any number of physical storage resources. In addition, although each virtual resource 212 is depicted as including only physical storage resources 216 disposed in the same storage node 211, a virtual resource 212 may include physical storage resources 216 disposed in different storage nodes 211.

Although the embodiment shown in FIG. 2 depicts system 200 having three storage nodes 211, storage array 210 may have any number of storage nodes 211. In addition, although the embodiment shown in FIG. 2 depicts each storage node 211 having six storage resources 216, each storage node 211 of system 200 may have any number of storage resources 216. In certain embodiments, one or more storage nodes 211 may be or may comprise a storage enclosure configured to hold and power one or more physical storage resources 216. In the same or alternative embodiments, one or more storage nodes 211 may be or may solely comprise a singular virtual resource 212. In the same or alternative embodiments, one or more storage nodes 211 may be or may solely comprise a singular physical storage resource 216. Accordingly, as used in this disclosure, "storage node" broadly refers to a physical storage resource, a virtual resource, a storage enclosure, and/or any aggregation thereof.

Although FIG. 2 depicts that host devices 202 are communicatively coupled to storage array 210 via network 208, one or more host devices 202 may be communicatively coupled to one or more physical storage resources 216 without the need of network 208 or another similar network. For example, in certain embodiments, one or more physical storage resources 216 may be directly coupled and/or locally attached to one or more host devices 202.

In operation, system 200 may permit the communication of data from a host device 202 for storage on a plurality of storage nodes 211 (e.g., a READ and/or DATA IN operation by host device 202) in accordance with the methods described in FIGS. 3A, 3B, 4A and 4B. In the same of alternative embodiments, system 200 may permit the communication of data from a plurality of storage nodes 211 to host device 202 (e.g., a WRITE and/or DATA OUT operation by host device 202) in accordance with the methods described in FIGS. 5A, 5B, 6A, and 6B.

Generally speaking, system 200 may permit communication of data directly between host device 202 and all storage nodes 211 on which a particular piece of data may be stored, without the need of a particular storage node 211 serving as a communication interface between host device 202 and other storage nodes 211.

Figure 3A:
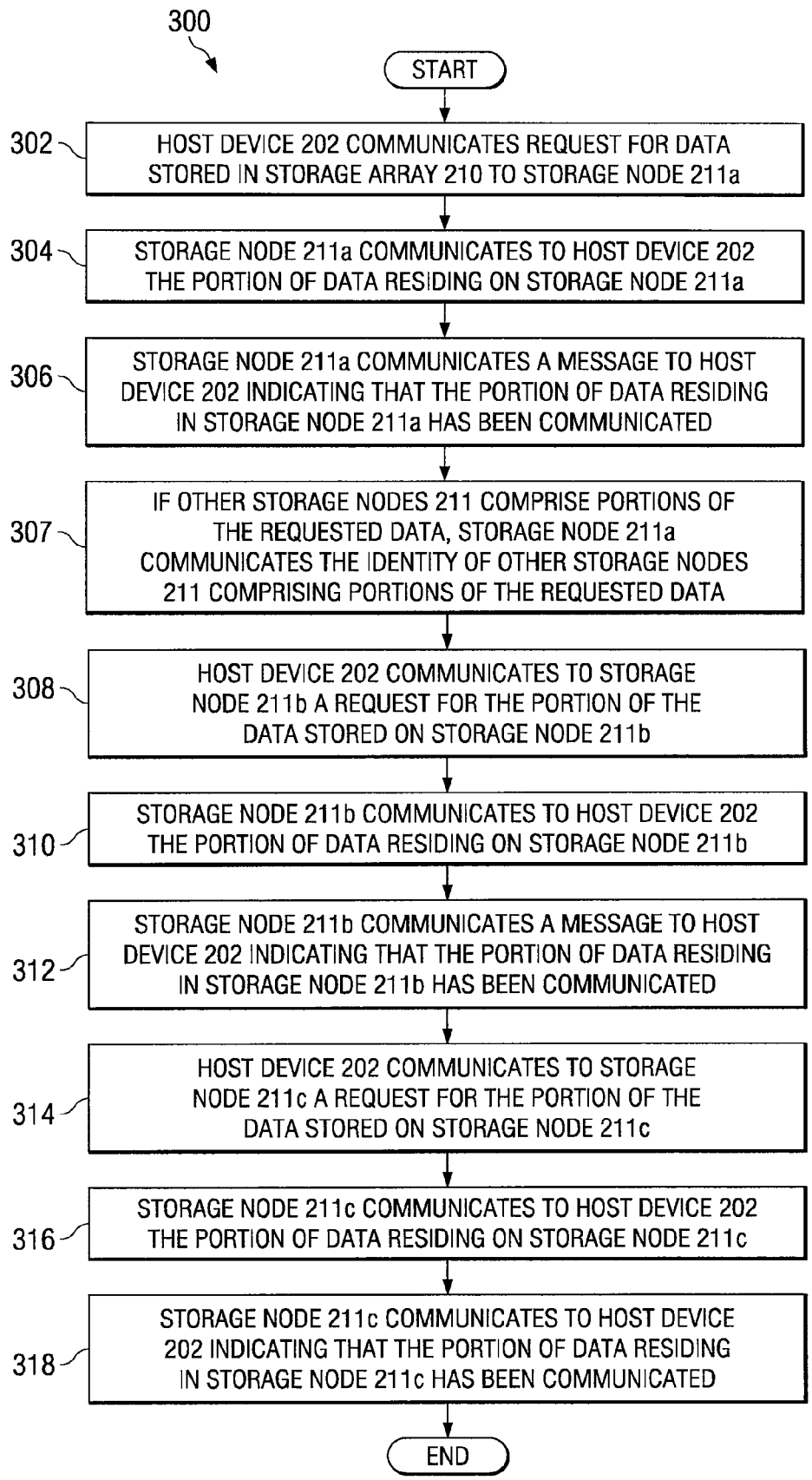
FIGS. 3A and 3B each illustrate a flow chart of an example method for reading data from a storage array, in accordance with the present disclosure.
Figure 3B:
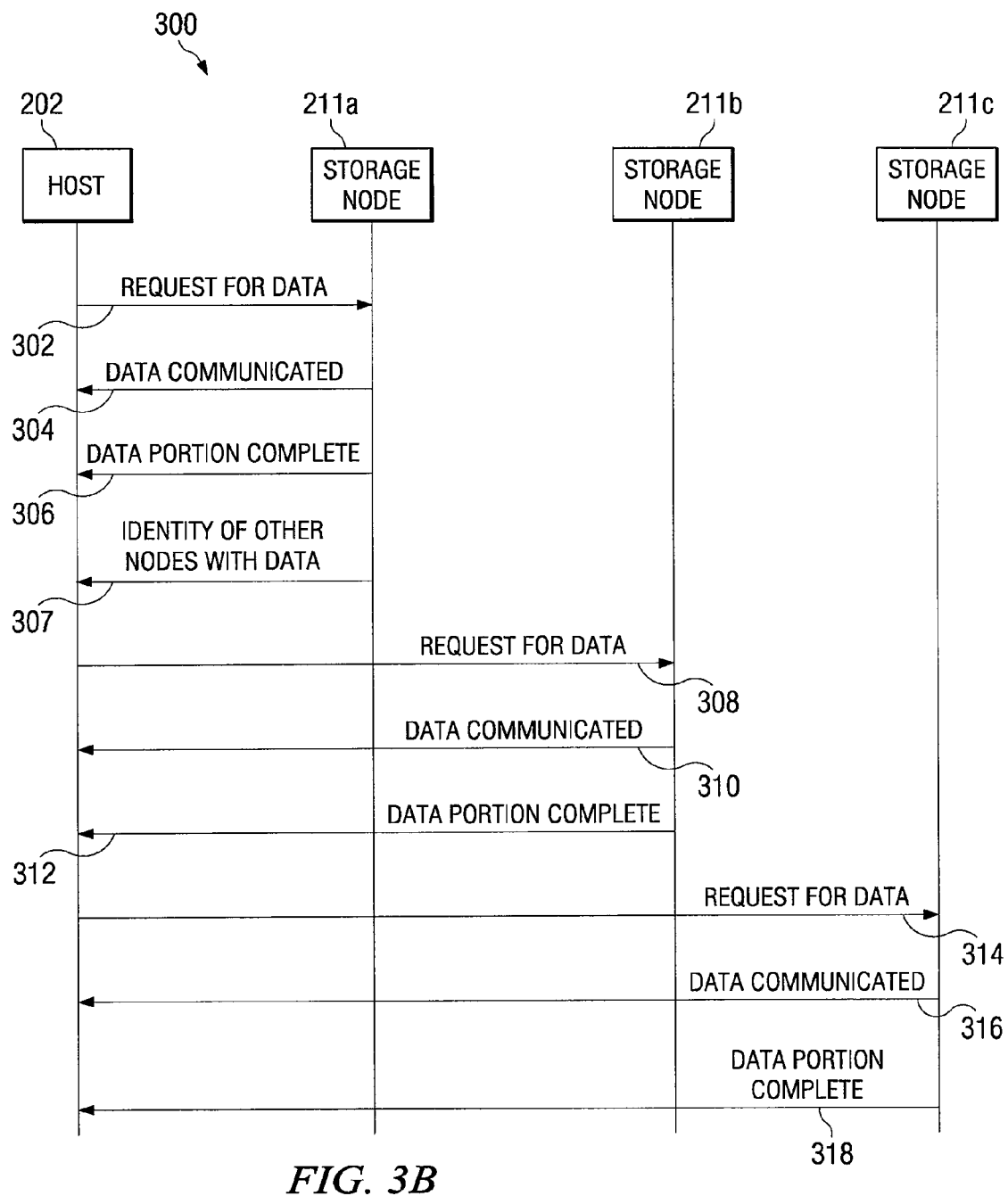

The methods depicted in FIGS. 3A-6B may overcome some or all of the disadvantages of conventional approaches to the communication of data in a storage network. FIGS. 3A and 3B each illustrate a flow chart of an example method 300 for reading data from a storage array, in accordance with the present disclosure. In one embodiment, method 300 includes communicating from host device 202 a request for data stored in a plurality of storage nodes 211 disposed in storage array 210, and communicating the portion of the data stored on each of the plurality of storage nodes 211 from each respective storage node 211 to the host device 202.

According to one embodiment, method 300 preferably begins at step 302. As noted above, teachings of the present disclosure may be implemented in a variety of configurations of system 200. As such, the preferred initialization point for method 300 and the order of the steps 302-318 comprising method 300 may depend on the implementation chosen.

At step 302, host device 202 may communicate to storage array 210 and/or storage node 211a disposed in storage array 210 a request for data stored in a plurality of storage nodes 211. For example, host device 202 may communicate to storage array 210 a SCSI "READ" command. In response, at step 304, storage node 211a may communicate to host device 202 the portion of the requested data residing on storage node 211a.

At step 306, storage node 211a may communicate a message to host device 202 indicating that the portion of the requested data residing in storage node 211a has been communicated to host device 202. For example, in SCSI implementations of method 300, storage node 211a may issue a "STATUS" command to indicate that the portion of the requested data residing in storage node 211a has been communicated to host device 202.

At step 307, storage node 211a may communicate a message identifying the other storage nodes 211 comprising remaining portions of the requested data if portions of the requested data reside on storage nodes 211 other than storage node 211a. For example, storage array 211a may refer to a metadata file stored on storage array 211a or elsewhere on storage array 210 and/or system 200 to identify and communicate to host device 202 the other storage node(s) 211 comprising the remaining data responsive to the request for data. In certain embodiments, the message communicated at step 306 and the message communicated at step 307 may be combined. For example, the message communicated at step 306 may include one or more fields identifying the other storage nodes 211 comprising the remaining portions of the requested data. In SCSI implementations, the message communicated at step 307 may comprise a REDIRECT READ message. In certain embodiments, a vendor-specific command and/or message may be communicated from storage node 211a to host device 202 to indicate completion of the data transfer from storage node 211a and/or identify other storage nodes 211 comprising the remaining portions of the requested data.

At step 308, host device 202 may communicate a message to storage node 211b requesting the portion of the requested data residing on storage node 211b. For example, host device 202 may communicate a SCSI READ command, SCSI REDIRECT ACK command, and/or similar command to storage node 211b to indicate that host device 202 is ready for the data stored on storage node 211b. In certain embodiments, a vendor-specific command and/or message may be communicated from host device 202 to storage node 211b to indicate that host device 202 is ready for the data stored on storage node 211b.

At step 310, storage node 211b may, in response to the message of step 308, communicate to host device 202 the portion of the data residing on storage node 211b. At step 312, storage node 211b may communicate a message to host device 202 indicating that the portion of the requested data residing in storage node 211b has been communicated to host device 202. The message communicated at step 312 may be identical or similar to the message communicated at step 306.

At step 314, host device 202 may communicate a message to storage node 211b requesting the portion of the requested data residing on storage node 211c. In certain embodiments, the message communicated at step 314 may be identical or similar to the message communicated at step 308.

At step 316, storage node 211c may, in response to the message of step 314, communicate to host device 202 the portion of the data residing on storage node 211c. At step 318, storage node 211c may communicate a message to host device 202 indicating that the portion of the requested data residing in storage node 211c has been communicated to host device 202. The message communicated at step 318 may be similar to the message communicated at steps 306 and/or 312. After completion of step 318, method 300 may end.

Although FIG. 3 discloses a particular number of steps to be taken with respect to method 300, method 300 may be executed with more or fewer steps than those depicted in FIG. 3. In addition, although FIG. 3 discloses a certain order of steps to be taken with respect to method 300, the steps comprising method 300 may be completed in any suitable order. For example, in certain embodiments, steps 314-318 may occur before steps 308-312. In other embodiments, the latency of method 300 may be reduced by executing steps 308-312 substantially in parallel with steps 314-318. In yet another embodiment, step 307 may execute prior to step 304, and steps 304-306 may execute in parallel with steps 308-312 and/or 314-318, further reducing latency.

In certain embodiments, system 200 and methods similar to method 300 may also be used in a redundant storage array. To illustrate, in a particular embodiment a plurality of storage nodes 211 may mirror data in a redundant manner. Accordingly a host device 202 may issue a request for data to storage node 211a (as in step 302). If node 211a is too busy to timely process the request, storage node 211a may communicate to host device 202 a message identifying other nodes (e.g., storage nodes 211b and 211c) that hold the mirrored data (as in step 307). Accordingly, either or both of storage nodes 211b and 211c may respond to the request and transmit the requested data to host device 202.

Method 300 may be implemented using system 200 or any other system operable to implement method 300. In certain embodiments, method 300 may be implemented partially or fully in software embodied in tangible computer readable media. As used in this disclosure, "tangible computer readable media" means any instrumentality, or aggregation of instrumentalities that may retain data and/or instructions for a period of time. Tangible computer readable media may include, without limitation, random access memory (RAM), read-only memory (ROM), electrically erasable programmable read-only memory (EEPROM), a PCMCIA card, flash memory, direct access storage (e.g., a hard disk drive or floppy disk), sequential access storage (e.g., a tape disk drive), compact disk, CD-ROM, DVD, and/or any suitable selection of volatile and/or non-volatile memory and/or a physical or virtual storage resource.

Figure 4A:
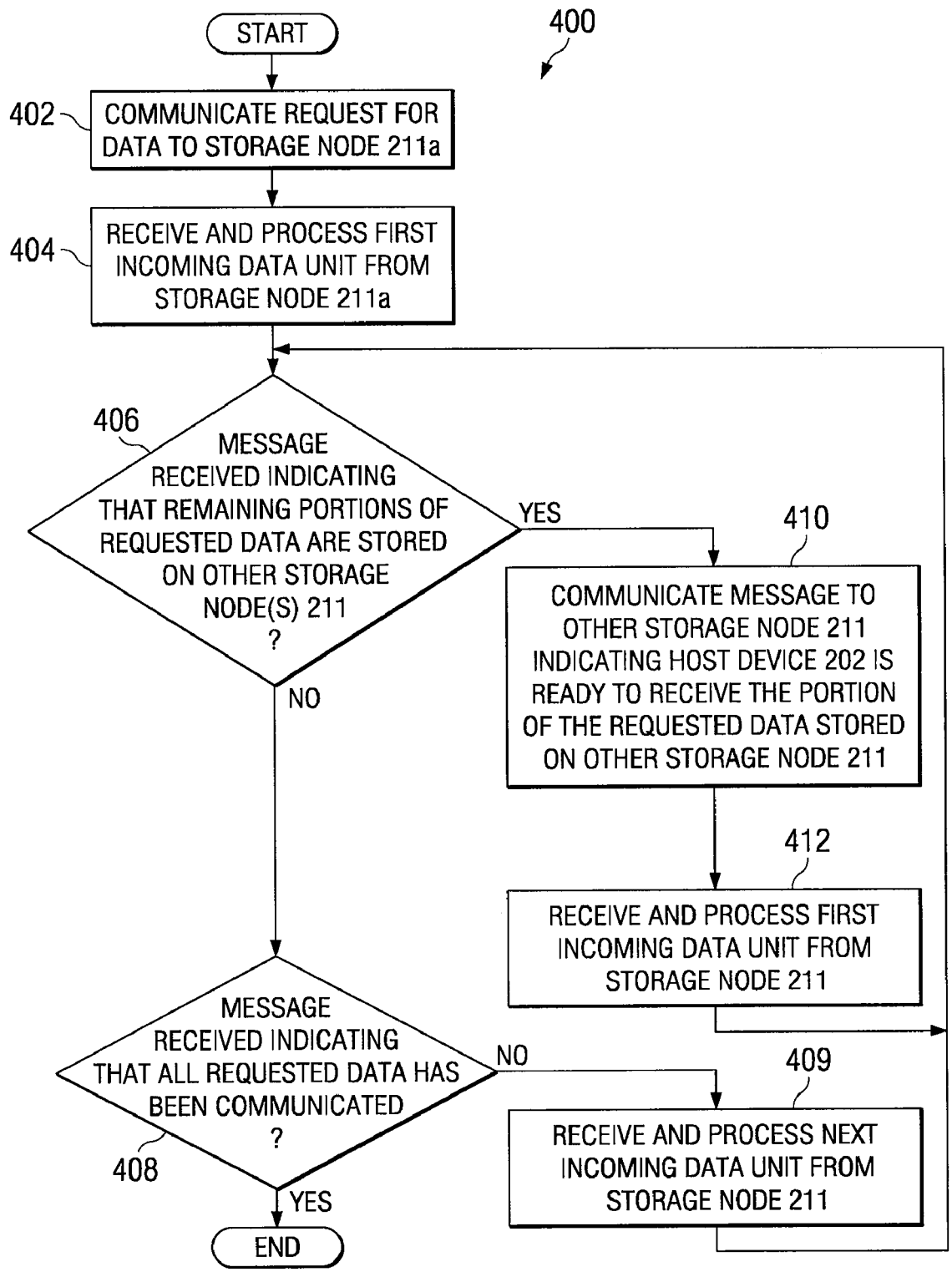
FIG. 4A illustrates a flow chart of an example method performed at a host device in connection with reading data from a storage array, in accordance with the present disclosure.

FIG. 4A illustrates a flow chart of an example method 400 performed at a host device 202 in connection with reading data from a storage array, in accordance with the present disclosure. For example, in certain embodiments method 400 may be performed by or on a host device 202 in connection with method 300 described above.

According to one embodiment, method 400 preferably begins at step 402. As noted above, teachings of the present disclosure may be implemented in a variety of configurations of system 200. As such, the preferred initialization point for method 400 and the order of the steps 402-412 comprising method 400 may depend on the implementation chosen.

At step 402, host device 202 may communicate a request for data (e.g., "READ" command) to storage array 210 and/or storage node 211a. At step 404, host device 202 may receive and process a first incoming data unit from storage node 211a. As used in this disclosure, the term "data unit" may refer to any protocol data unit, Ethernet frame, TCP/IP packet, and/or any suitable analogous data unit that may be transferred between a host device 202 and a storage node 211 or vice versa.

It is well known that any transfer of data may comprise any number of data units. Accordingly, after receipt of each data unit, host device 202 may monitor whether the subsequent communication is a message indicating that no further data units comprising the requested data are present on a particular storage node 211. Thus, after each data unit is received and processed at steps 404 and 412 (see below for discussion of step 412), host device 202 may determine, at step 406, whether the subsequent communication from a storage node 211 is a message indicating that remaining portions of the requested data reside on one or more other storage nodes 211.

If, at step 406, it is determined that a message is received from a storage node 211 indicating that all portions of the requested data stored on the particular storage node 211 have been communicated to host device 202 (e.g., "REDIRECT READ"), method 400 may proceed to step 410. Otherwise, method 400 may proceed to step 408.

At step 408, host device 202 may determine whether a communication subsequent to a data unit transfer is a message indicating that all requested data from storage array 210 has been communicated to host device 202 (e.g., "STATUS"). If it is determined at step 408 that a message is received from a storage node 211 indicating that all portions of the requested data stored in storage array 210 have been communicated to host device 202, method 400 may end. Otherwise, method 400 may proceed to step 409, in which another data unit is received and processed.

At step 409, host device 202 may receive and process the next incoming data unit from storage node 211. After completion of step 409, method 400 may proceed again to step 406, where steps 406-409 may be repeated until all data has been communicated from the particular storage node 409.

At step 410, in response to a message at step 406 indicating that the portion of the requested data stored on a particular storage node 211 has been communicated to host device 202, host device 202 may communicate a message to another storage node 211 indicating that host device 202 is ready to receive the portion of the requested data stored on the other storage node 211 (e.g., "READ," "REDIRECT ACK"). After completion of step 410, method 400 may proceed to step 412.

At step 412, host device 202 may receive and process a first incoming data unit from storage node 211. After completion of step 412, method 400 may proceed again to step 406, where another determination of whether all of the requested data stored on the particular storage node 211 and/or storage array 210 has been communicated.

Although FIG. 4A discloses a particular number of steps to be taken with respect to method 400, method 400 may be executed with more or fewer steps than those depicted in FIG. 4A. In addition, although FIG. 4A discloses a certain order of steps to be taken with respect to method 400, the steps comprising method 400 may be completed in any suitable order.

Method 400 may be implemented using system 200 or any other system operable to implement method 400. In certain embodiments, method 400 may be implemented partially or fully in software embodied in tangible computer readable media.

Figure 4B:
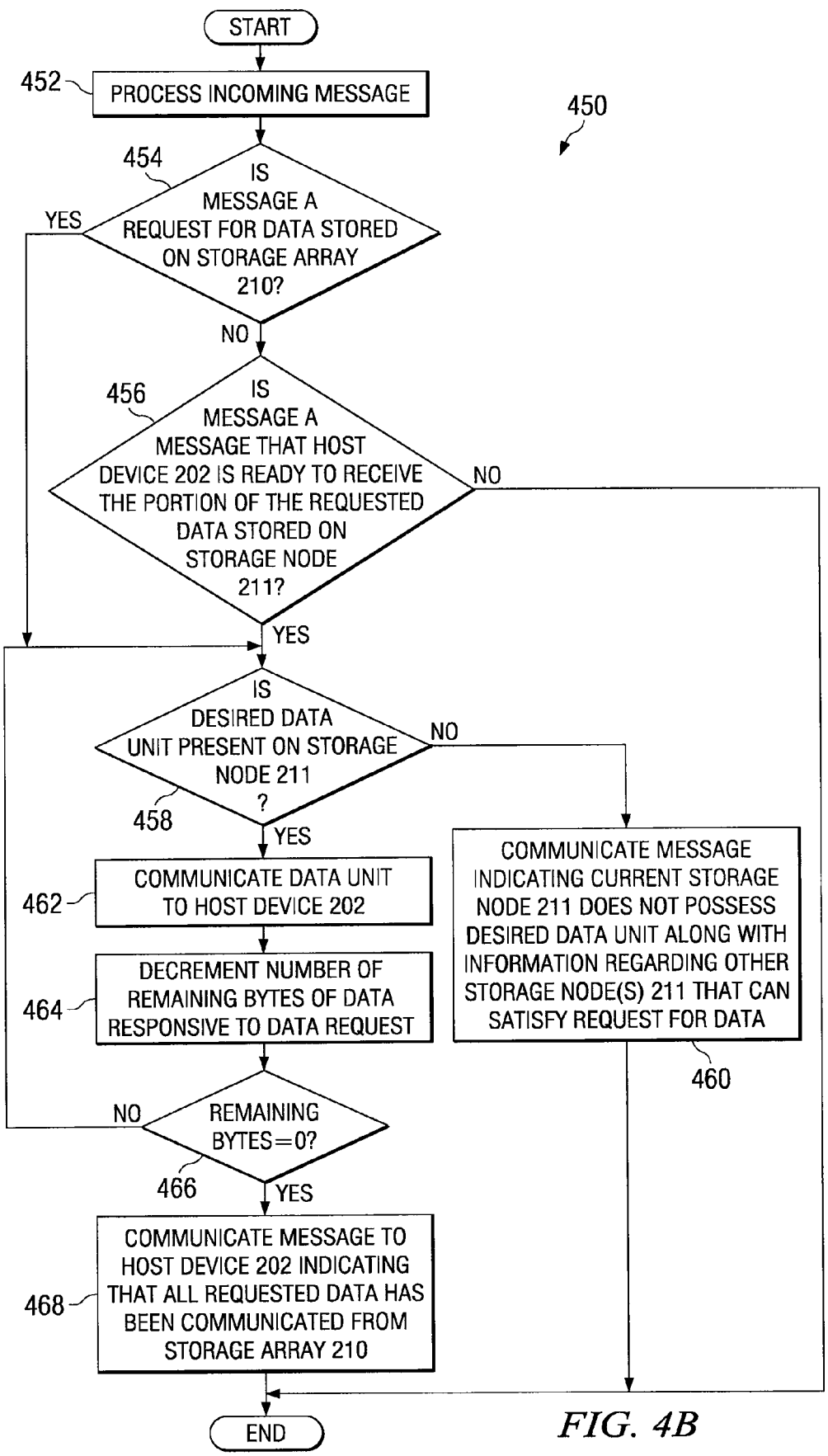
FIG. 4B illustrates a flow chart of an example method performed at a storage node in connection with reading data from a storage array, in accordance with the present disclosure.

FIG. 4B illustrates a flow chart of an example method 450 performed at a storage node 211 in connection with reading data from a storage array 210, in accordance with the present disclosure. For example, in certain embodiments method 450 may be performed by or on a host device 202 in connection with method 300 described above.

According to one embodiment, method 450 preferably begins at step 452. As noted above, teachings of the present disclosure may be implemented in a variety of configurations of system 200. As such, the preferred initialization point for method 450 and the order of the steps 452-468 comprising method 450 may depend on the implementation chosen.

At step 452, a particular storage node 211 (e.g., storage node 211a) may process an incoming message communicated by a host device 202. At step 454, the storage node 211 may determine if the message processed at step 452 is a request for data stored on storage array 210 (e.g., "READ"). If it is determined at step 454 that the message is a request for data stored on storage array 210, method 450 may proceed to step 458. Otherwise, method 450 may proceed to step 456.

At step 456, the particular storage node 211 may determine if the message processed at step 452 is a message that host device 202 is ready to receive the portion of the requested data stored on the particular storage node 211 (e.g., "REDIRECT ACK"). If it is determined at step 456 that the message is a message that host device 202 is ready to receive the portion of the requested data stored on the particular storage node 211, method 450 may proceed to step 458. Otherwise, method 450 may end.

At step 458, the particular storage node 211 may determine whether a desired data unit to be communicated in connection with a request for data is stored on the particular storage node 211. If the desired data unit is not stored on the particular storage node 211, method 450 may proceed to step 460. Otherwise, method 450 may proceed to step 462.

At step 460, the particular storage node 211 may communicate a message to host device 202 indicating that the particular storage node 211 does not possess the desired data unit (e.g., "REDIRECT READ"). The particular storage node 211 may also communicate data regarding other storage node(s) 211 that can satisfy the request for data. After completion of step 460, method 450 may end.

At step 462, the particular storage node 211 may communicate a data unit to host device 202. At step 464, that particular storage node 211 may decrement a counter that tracks the number of bytes remaining to be communicated from the particular storage node 210 in connection with the message requesting data from host 202. At step 466, a determination may be made whether the number of bytes remaining to be communicated from storage array 210 to host device 202 in connection with a request for data is equal to zero. If the remaining number of bytes is not equal to zero, method 450 may proceed again to step 458 where the remaining bytes of data may be communicated to host device 202 in accordance with steps 458-466. Otherwise, if all bytes of data responsive to the request for data have been communicated to host device 202, method 450 may proceed to step 468.

At step 468, in response to determining that all bytes of data responsive to a request for data have been communicated to host device 202, storage node 211 may communicate a message to host device 202 indicating that all requested data has been communicated from storage array 210 (e.g., "STATUS").

Although FIG. 4B discloses a particular number of steps to be taken with respect to method 450, method 450 may be executed with more or fewer steps than those depicted in FIG. 4B. In addition, although FIG. 4B discloses a certain order of steps to be taken with respect to method 450, the steps comprising method 450 may be completed in any suitable order.

Method 450 may be implemented using system 200 or any other system operable to implement method 450. In certain embodiments, method 450 may be implemented partially or fully in software embodied in tangible computer readable media.

Figure 5A:
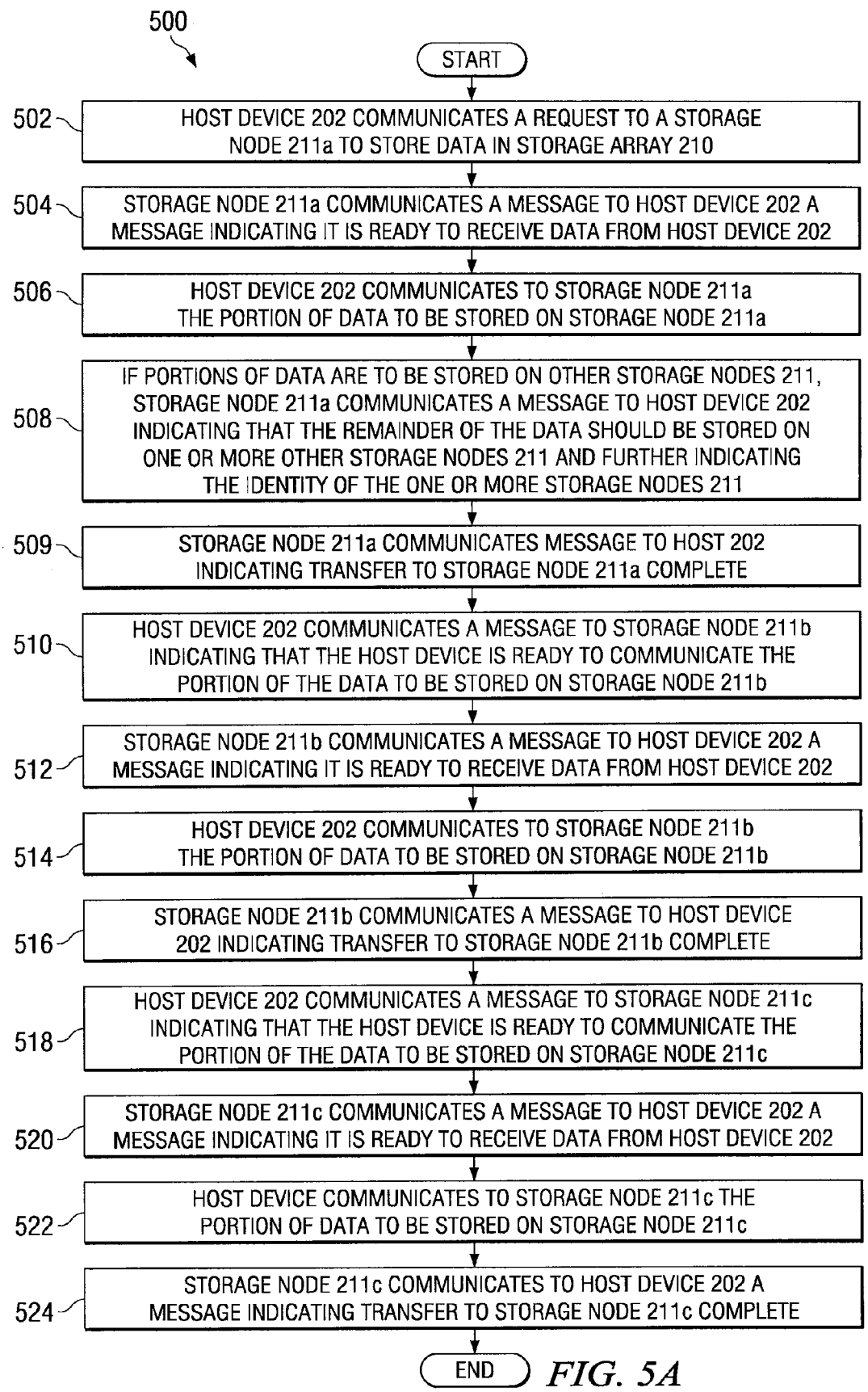
FIGS. 5A and 5B each illustrate a flow chart of an example method for writing data to a storage array, in accordance with the present disclosure.
Figure 5B:
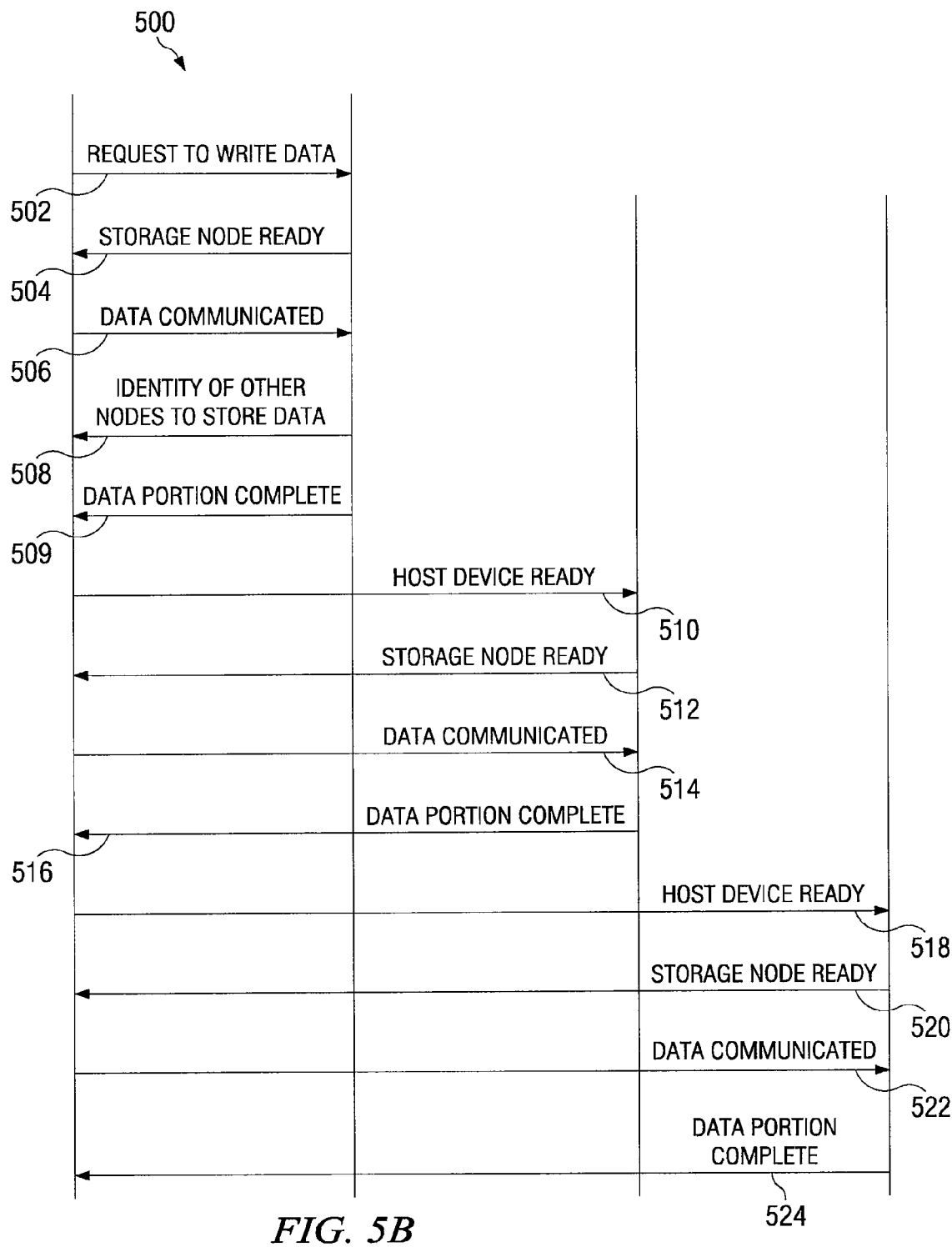

FIGS. 5A and 5B each illustrate a flow chart of an example method 500 for writing data to a storage array, in accordance with the present disclosure. In one embodiment, method 500 includes communicating a request from host device 202 a request to store data in a plurality of storage nodes 211 disposed in storage array 210, and communicating from the host device 202 to each of the plurality of the storage nodes 211, each storage node's respective portion of the data to be stored.

According to one embodiment, method 500 preferably begins at step 502. As noted above, teachings of the present disclosure may be implemented in a variety of configurations of system 200. As such, the preferred initialization point for method 500 and the order of the steps 502-524 comprising method 500 may depend on the implementation chosen.

At step 502, host device 202 may communicate to storage array 210 and/or storage node 211a disposed in storage array 210 a request to store data in storage array 210. For example, host device 202 may communicate to storage array 210 and/or storage node 211a a SCSI "WRITE" command. In response, at step 504, storage node 211a may communicate a message to host device indicating that it is ready to receive data from host device 202. For example, storage node 211a may communicate a SCSI "READY TO TRANSFER" message to host device at step 504 to indicate it is ready to receive the portion of the data that can be written to it.

At step 506, host device 202 may communicate to storage node 211a the portion of the data to be stored on storage node 211a. At step 508, if portions of the data are to be stored on other storage nodes 211, storage node 211a may communicate a message to host device 202 indicating that the remainder of the data should be stored on one or more other storage nodes 211. In some embodiments, storage node 211a may communicate a message identifying the other storage node(s) 211 to which the remaining data should be stored. For example, in SCSI implementations of method 500, storage node 211a may issue a "REDIRECT WRITE" command to indicate that the portion of the data to be stored in storage node 211a has been stored and that the remainder of the data to be stored should be stored on one or more other storage nodes 211. The message communicated may include one or more fields identifying the other storage nodes to which the remainder of the data is to be stored. In certain embodiments a vendor-specific command and/or message may be communicated at step 508.

At step 509, storage node 211a may communicate a message to host 202 indicating that the transfer of the portion of data to be stored in storage node 211a is complete. In SCSI implementations, the message communicated at step 509 may be a "STATUS" message.

At step 510, host device 202 may communicate a message to storage node 211b indicating that host device 202 is ready to communicate the portion of the data to be stored on storage node 211b. For example, host device 202 may communicate a SCSI WRITE command, SCSI REDIRECT ACK command, and/or similar command to storage node 211b to indicate that host device 202 is ready to store a portion of the data on storage node 211b. In certain embodiments, a vendor-specific command and/or message may be communicated from host device 202 to storage node 211b to indicate that host device 202 is ready to store data on storage node 211b.

In response to the message communicated at step 510, storage node 211b may, at step 512, communicate a message to host device indicating that it is ready to receive data from host device 202. In some embodiments, the message communicated at step 512 may be identical or similar to the message communicated at step 504. At step 514, host device 202 may communicate to storage node 211b the portion of the data to be stored on storage node 211b. At step 516, storage node 211b may communicate a message to host device 202 indicating that the transfer of data to be stored in storage node 211b is complete. In certain embodiments, the message communicated at step 516 may be identical or similar to the message communicated at step 509.

At step 518, host device 202 may communicate a message to storage node 211c indicating that host device 202 is ready to communicate the portion of the data to be stored on storage node 211c. In certain embodiments, the message communicated at step 518 may be identical or similar to the message communicated at step 510.

In response to the message communicated at step 518, storage node 211c may, at step 520, communicate a message to host device indicating that it is ready to receive data from host device 202. In some embodiments, the message communicated at step 520 may be identical or similar to the message communicated at step 504 and/or step 512. At step 522, host device 202 may communicate to storage node 211c the portion of the data to be stored on storage node 211c. At step 524, storage node 211b may communicate a message to host device 202 indicating that the transfer of data to be stored on storage node 211a has been completed. In certain embodiments, the message communicated at step 524 may be a SCSI "STATUS" command or similar command indicating that all data responsive to host device 202's original request to write data has been communicated. In addition, the message communicated at step 524 may be similar to the message communicated at steps 509 and/or 516. After completion of step 524, method 500 may end.

Although FIG. 5 discloses a particular number of steps to be taken with respect to method 500, method 500 may be executed with more or fewer steps than those depicted in FIG. 5. In addition, although FIG. 5 discloses a certain order of steps to be taken with respect to method 500, the steps comprising method 500 may be completed in any suitable order. For example, in certain embodiments, steps 518-524 may complete before steps 510-516. In other embodiments, the latency of method 500 may be reduced by executing steps 510-516 substantially in parallel with steps 518-524.

Method 500 may be implemented using system 200 or any other system operable to implement method 500. In certain embodiments, method 500 may be implemented partially or fully in software embodied in tangible computer readable media.

Figure 6A:
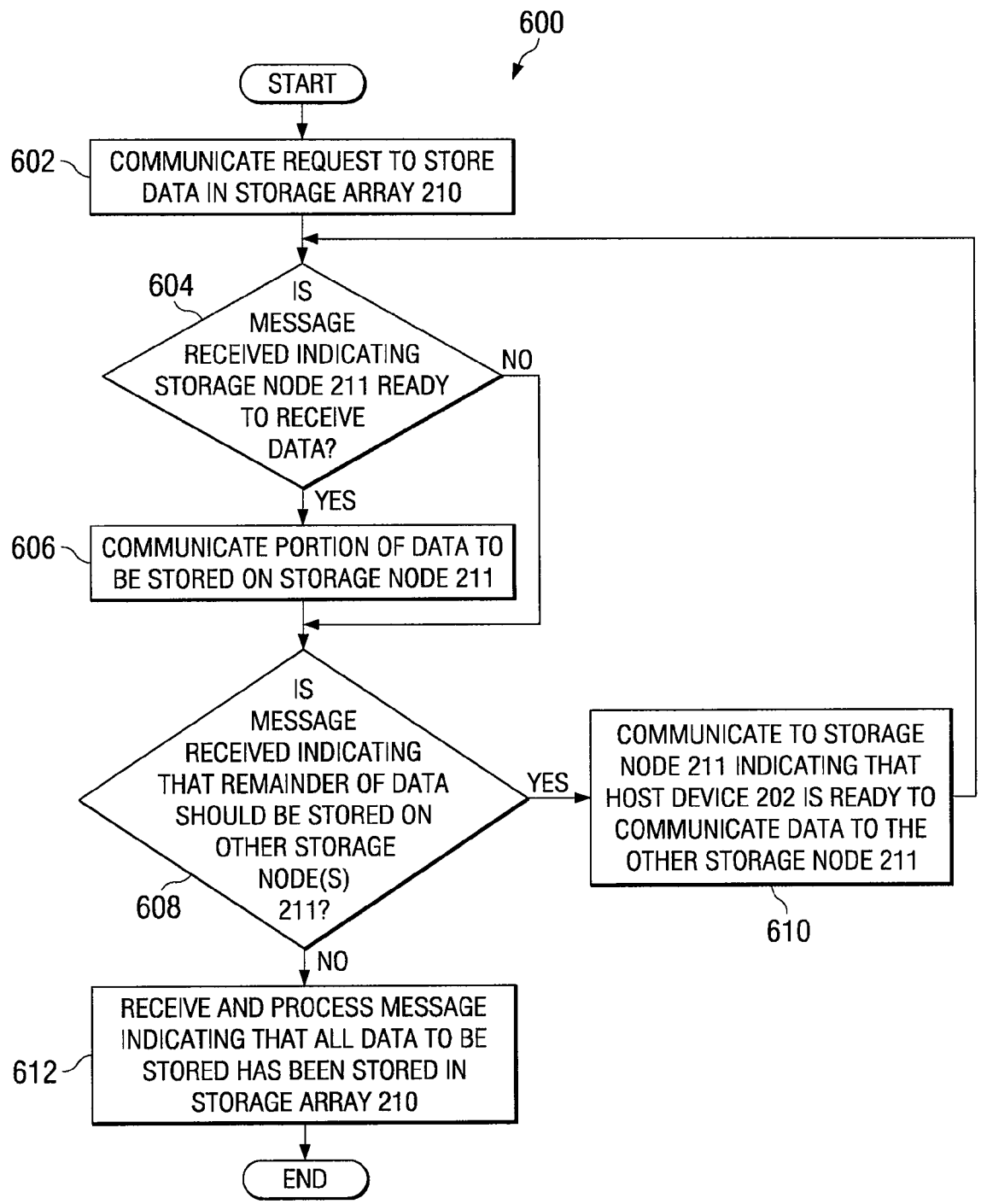
FIG. 6A illustrates a flow chart of an example method performed at a host device in connection with writing data to a storage array, in accordance with the present disclosure.

FIG. 6A illustrates a flow chart of an example method 600 performed at a host device 202 in connection with writing data to a storage array, in accordance with the present disclosure. For example, in certain embodiments method 600 may be performed by or on a host device 202 in connection with method 500 described above.

According to one embodiment, method 600 preferably begins at step 602. As noted above, teachings of the present disclosure may be implemented in a variety of configurations of system 200. As such, the preferred initialization point for method 600 and the order of the steps 602-612 comprising method 600 may depend on the implementation chosen.

At step 602, host device 202 may communicate a request to storage array 210 to store data in storage array 210 (e.g., "WRITE"). At step 604, host device 202 may determine if it has received a message from a storage node 211 indicating that the storage node 211 is ready to receive data (e.g., "READY TO TRANSFER"). If it is determined at step 604 that host device 202 has received a message indicating that storage node 211 is ready to receive data, method 600 may proceed to step 606. Otherwise, method 600 may proceed to step 608.

At step 606, host device 202 may communicate to storage node 211 the portion of the data to be stored on storage node 211. At step 608, host device 202 may determine if it has received a message from storage node 211 indicating that the remainder of the data to be stored in storage array 210 should be stored in one or more storage nodes 211 other than the storage node 211 transmitting the message (e.g., "REDIRECT WRITE"). If, at step 608, it is determined that host device 202 has received a message indicating that the remainder of data should be stored on one or more other storage nodes 211, method 600 may proceed to step 610. Otherwise, method 600 may proceed to step 612.

At step 610, host device 202 may communicate to storage node 211 that host device 202 is ready to communicate data to the other storage node 211 (e.g., "WRITE," "REDIRECT ACK"). After completion of step 610, method 600 may proceed again to step 604. At step 612, host device 202 may receive and process a message indicating that all data to be stored has been stored in a storage array 210 (e.g., "STATUS"). After completion of step 612, method 600 may end.

Although FIG. 6A discloses a particular number of steps to be taken with respect to method 600, method 600 may be executed with more or fewer steps than those depicted in FIG. 6A. In addition, although FIG. 6A discloses a certain order of steps to be taken with respect to method 600, the steps comprising method 600 may be completed in any suitable order.

Method 600 may be implemented using system 200 or any other system operable to implement method 600. In certain embodiments, method 600 may be implemented partially or fully in software embodied in tangible computer readable media.

Figure 6B:
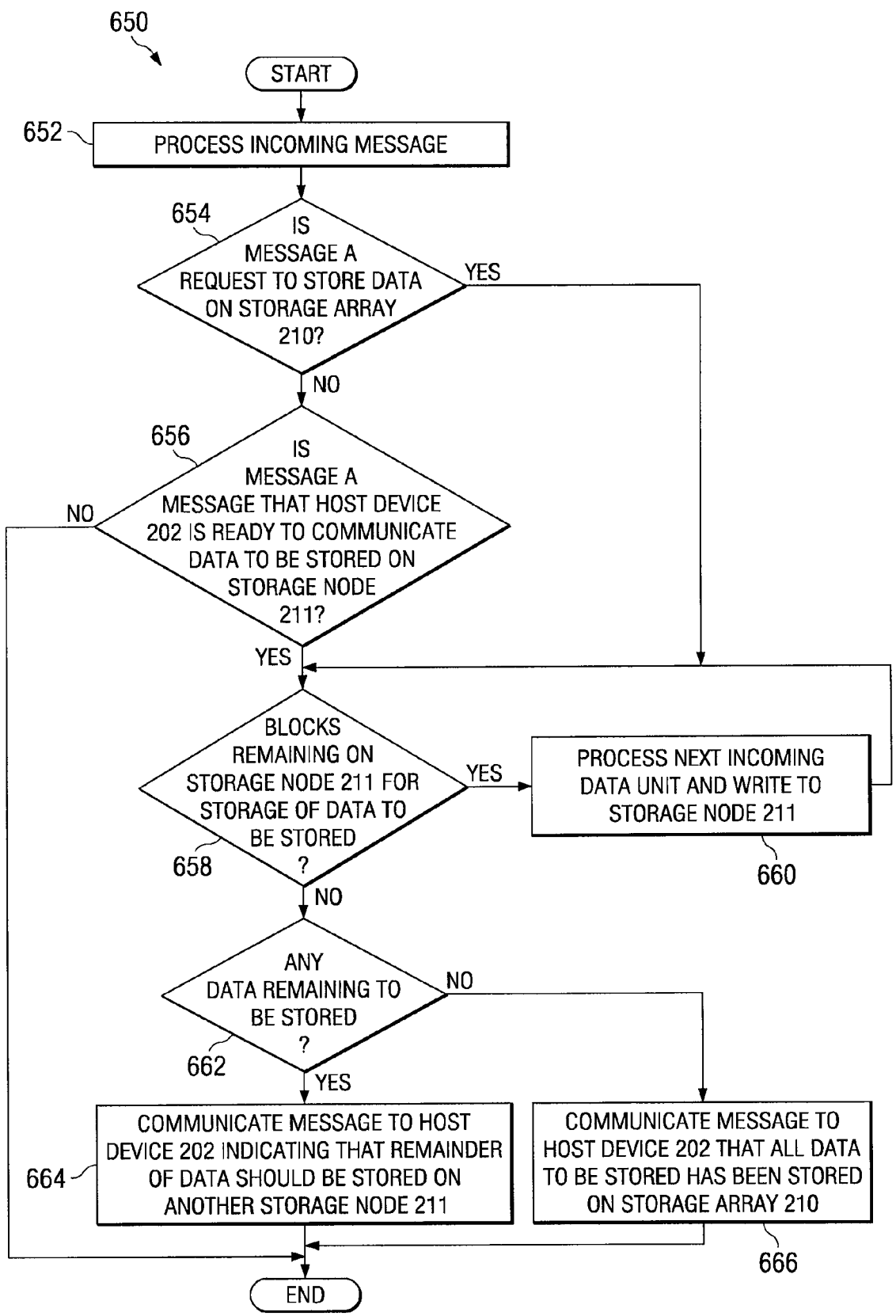
FIG. 6B illustrates a flow chart of an example method performed at a storage node in connection with writing data to a storage array, in accordance with the present disclosure.

FIG. 6B illustrates a flow chart of an example method 650 performed at a storage node 211 in connection with writing data to a storage array, in accordance with the present disclosure. For example, in certain embodiments method 650 may be performed by or on a host device 202 in connection with method 500 described above.

According to one embodiment, method 650 preferably begins at step 652. As noted above, teachings of the present disclosure may be implemented in a variety of configurations of system 200. As such, the preferred initialization point for method 650 and the order of the steps 652-666 comprising method 650 may depend on the implementation chosen.

At step 652, a storage node 211 may process an incoming message communicated by a host device 202. At step 654, the storage node 211 may determine if the message processed at step 652 is a request to store data on storage array 210 (e.g., "WRITE"). If it is determined at step 654 that the message is a request for data stored on storage array 210, method 650 may proceed to step 658. Otherwise, method 650 may proceed to step 656.

At step 656, the storage node 211 may determine if the message processed at step 652 is a message that host device 202 is ready to communicate the portion of the data to be stored on storage node 211 (e.g., "REDIRECT ACK," "WRITE"). If it is determined at step 656 that the message is a message that host device 202 is ready to communicate the portion of the data to be stored on storage node 211, method 650 may proceed to step 658. Otherwise, method 650 may end.

At step 658, storage node 211 may determine whether any blocks remain on storage node 211 to store any more of the data to be stored in storage array 210. If space remains on storage node 211, method 650 may proceed to step 660. Otherwise, method 600 may proceed to step 662.

At step 660, storage node 211 may process an incoming data unit and write it to storage node 211. After completion of step 660, method 650 may proceed to step 658, where steps 658 and 660 may repeat until no more blocks remain on storage device 210 for storage of the data to be stored in storage array 210.

At step 662, storage node 211 may determine whether any remaining data needs to be stored to storage array 210. If remaining data exists, method 650 may proceed to step 664. Otherwise, method 650 may proceed to step 666.

At step 664, storage node 211 may communicate to host device 202 a message indicating that the remainder of the data should be stored on one or more other storage nodes 211 (e.g., "REDIRECT WRITE"). After completion of step 664, method 650 may end.

At step 666, storage node 211 may communicate to host device 202 a message indicating that all of the data to be stored has been stored in storage array 210 (e.g., "STATUS"). After completion of step 666, method 650 may end.

Although FIG. 6B discloses a particular number of steps to be taken with respect to method 650, method 650 may be executed with more or fewer steps than those depicted in FIG. 6B. In addition, although FIG. 6B discloses a certain order of steps to be taken with respect to method 650, the steps comprising method 650 may be completed in any suitable order.

Method 650 may be implemented using system 200 or any other system operable to implement method 650. In certain embodiments, method 650 may be implemented partially or fully in software embodied in tangible computer readable media.

Using the methods and systems disclosed herein, problems associated conventional approaches to data communication in a storage array may be improved reduced or eliminated. For example, because the methods and systems disclosed may allow for communication between a host device and the plurality of storage nodes to or from which a particular item of data may be read or written, latency and network complexity associated with conventional communication and storage approaches may be reduced.

Although the present disclosure has been described in detail, it should be understood that various changes, substitutions, and alterations can be made hereto without departing from the spirit and the scope of the invention as defined by the appended claims.

What is claimed is:

1. A method for communicating data, comprising:
   communicating, from a host device to a storage array having a plurality of storage nodes, a request for data having different portions stored in multiple different storage nodes of the storage array;
   in response to the request, communicating from a first storage node of the storage array to the host device a first portion of the requested data stored on the first storage node;
   communicating a message from the first storage node to the host device indicating that a second portion of the requested data is stored on a second storage node of the storage array;
   communicating a message from the host device to the second storage node indicating that the host device is ready to receive the second portion of the requested data; and
   communicating from the second storage node to the host device a second portion of the requested data stored on the second storage node.

2. A method according to claim 1 further comprising:
   communicating a message from at least one of the first storage node and the second storage node to the host device indicating that a remaining portion of the data is stored on one or more other storage nodes;
   communicating a message from the host device to each of the one or more other storage nodes indicating that the host device is ready to receive the remaining portion of the data; and
   communicating, from each of the one or more other storage nodes to the host device, a portion of the requested data stored on such storage node;
   wherein the remaining portion of the data comprises such portion of the data other than the first portion of the data and the second portion of the data; and
   wherein the one or more other storage nodes comprise storage nodes other than the first storage node and the second storage node.

3. A method according to claim 2, further comprising communicating a message from at least one of the one or more other storage nodes indicating that all of the data has been communicated.

4. A method according to claim 2, wherein the communication by the second storage node of the second portion and the communication by each of the one or more other storage nodes of the remaining portion of the data occur substantially in parallel.

5. A method according to claim 1, wherein the host device, first storage node, and second storage node are coupled via a network.

6. A method according to claim 1, wherein communication is via a protocol selected from the group consisting of: Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), and integrated drive electronics (IDE).

7. A method for communicating data comprising:
   communicating a request from a host device to a storage array having a plurality of storage nodes to store data in the storage array;
   communicating a first portion of the data to be stored from the host device to a first storage node disposed in the storage array;
   communicating a message from the first storage node to the host device indicating that a second portion of the data should be stored on a second storage node disposed in the storage array; and
   communicating a second portion of the data to be stored from the host device to the second storage node.

8. A method according to claim 7 comprising communicating, from at least one of the first storage node and the second storage node to the host device a message indicating that the respective storage node is ready to receive the respective portion of the data to be stored.

9. A method according to claim 7 comprising communicating a message from the host device to the second storage node indicating that the host device is ready to communicate the second portion of the data to the second storage node.

10. A method according to claim 7 comprising:
    communicating a message from at least one of the first storage node and the second storage node to the host device indicating that a remaining portion of the data should be stored on one or more other storage nodes; and
    communicating, from the host device to each of the one or more other storage nodes, a respective portion of the data stored on such storage node;
    wherein the remaining portion of the data comprises such portion of the data other than the first portion of the data and the second portion of the data; and
    wherein the one or more other storage nodes comprise storage nodes other than the first storage node and the second storage node.

11. A method according to claim 10 comprising communicating a message from the host device to each of the one or more other storage nodes indicating that the host device is ready to communicate the respective portions of the data to the one or more other storage nodes.

12. A method according to claim 10, further comprising communicating a message from at least one of the one or more other storage nodes indicating that all of the data has been communicated.

13. A method according to claim 10, wherein the communication by the host of the second portion and the communication by the host of the remaining portion of data occur substantially in parallel.

14. A method according to claim 7, wherein the host device, first storage node and second storage node are coupled via a network.

15. A system for communication of data comprising:
a host device; and
a storage array having a first storage node and a second storage node, each of the first storage node and the second storage node communicatively coupled to the host device and to each other;
the host device operable to:
communicate a request to the storage array for data stored in the storage array;
receive from the first storage node a first portion of the requested data stored on the first storage node;
receive a message from the first storage node indicating that a second portion of the data is stored on a second storage node disposed in the storage array;
communicate a message to the second storage node indicating that the host device is ready to receive the second portion of the data; and
receive from the second storage node a second portion of the requested data stored on the second storage node.

16. A system according to claim 15 further comprising one or more other storage nodes, and wherein:
the host device is further operable to:
receive a message from at least one of the first storage node and the second storage node indicating that a remaining portion of the data is stored on the one or more other storage nodes;
communicate a message to each of the one or more other storage nodes indicating that the host device is ready to receive the remaining portion of the data; and
receive from each of the one or more other storage nodes, such portion of the data stored on such storage node;
the remaining portion of the data comprises such portion of the data other than the first portion of the data and the second portion of the data; and
the one or more other storage nodes comprise storage nodes other than the first storage node and the second storage node.

17. A system according to claim 16, wherein the communication by the second storage node of the second portion and the communication by each of the one or more other storage nodes of the remaining portion of the data occur substantially in parallel.

18. A system for communication of data comprising:
a host device; and
a storage array having a first storage node and a second storage node, each of the first storage node and the second storage node communicatively coupled to the host device and to each other;
the host device operable to:
communicate a request to the storage array to store data in the storage array;
communicate to the first storage node a first portion of the data to be stored;
receive from the first storage node a message indicating that a second portion of the data should be stored on a second storage node disposed in the storage array; and
communicate to the second storage node a second portion of the data to be stored.

19. A system according to claim 18 further comprising one or more other storage nodes, and wherein:
the host device is further operable to:
receive from at least one of the first storage node and the second storage node a message indicating that a remaining portion of the data should be stored on the one or more other storage nodes; and
communicating to each of the one or more other storage nodes a respective portion of the data stored on such storage node;
wherein the remaining portion of the data comprises such portion of the data other than the first portion of the data and the second portion of the data; and
wherein the one or more other storage nodes comprise storage nodes other than the first storage node and the second storage node.

20. A system according to claim 18, wherein the communication of the second portion and the communication of the remaining portion of the data occurs substantially in parallel.

* * * * *